T. E. MURRAY, Jr., AND J. B. MURRAY.
ELECTRODE FOR ELECTRICAL WELDING MACHINES.
APPLICATION FILED JULY 3, 1920.

1,399,307. Patented Dec. 6, 1921.

Inventors
Thomas E. Murray Jr
Joseph B. Murray
By their Attorney

UNITED STATES PATENT OFFICE.

THOMAS E. MURRAY, JR., AND JOSEPH B. MURRAY, OF BROOKLYN, NEW YORK.

ELECTRODE FOR ELECTRICAL WELDING-MACHINES.

1,399,307. Specification of Letters Patent. Patented Dec. 6, 1921.

Application filed July 3, 1920. Serial No. 393,863.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Electrodes for Electrical Welding-Machines, of which the following is a specification.

The invention relates to an electrode for electrical welding machines, in the face of which is a recess in which one of the parts to be welded is seated. The invention consists in the construction of the removable bars disposed in and over said recess, which bars support the part out of contact with the material of the electrode itself.

When in the process of electrical welding, the parts or sections of a hollow object to be united are directly seated in recesses in the electrodes, there is apt to be more or less imperfect contact between said parts and the surface of the electrodes, with consequent irregular distribution of the current, together with current concentration at the edges of the recesses and at isolated points therein which in time impairs the material of the electrodes.

Our present invention is a construction for said electrodes, whereby the aforesaid difficulties are prevented and the electrodes protected from injury.

In the accompanying drawing—

Figure 1:
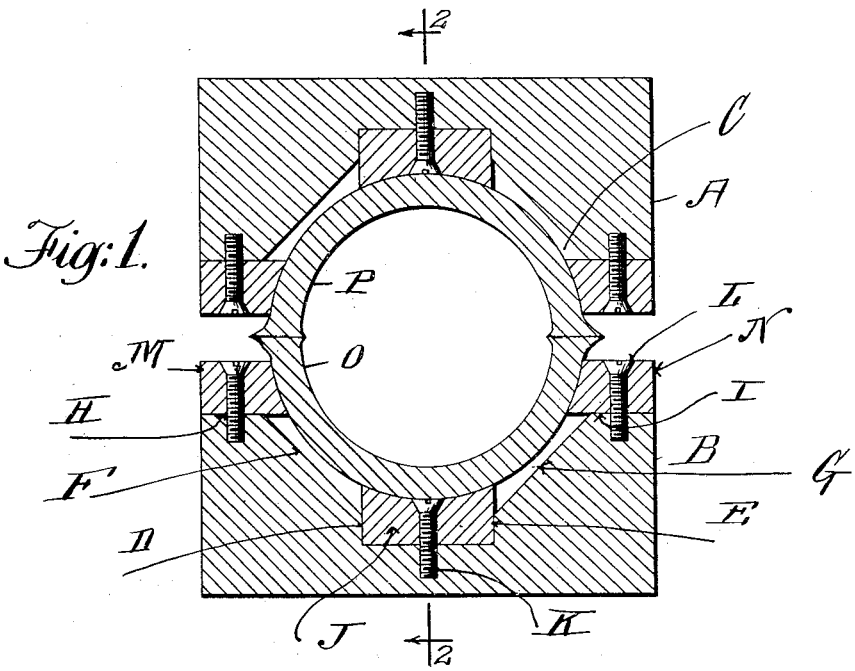
Figure 2:
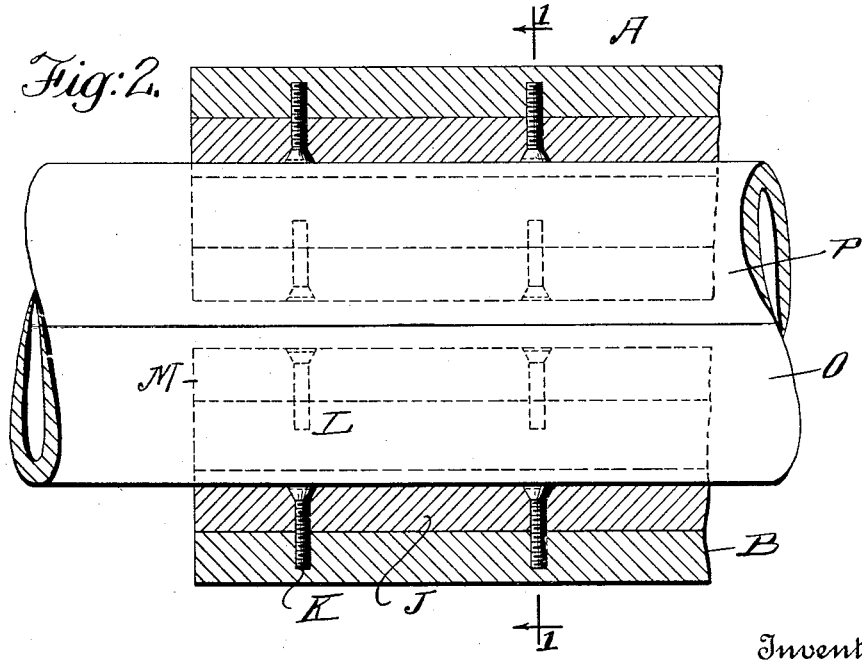

Figure 1 is a transverse section of two electrodes and a welded tube therein, on the line 1, 1 of Fig. 2. Fig. 2 is a longitudinal section on the line 2, 2 of Fig. 1.

Similar letters of reference indicate like parts.

The two electrodes A, B are alike, so that a description of one applies to both. In the face of said electrode is formed a longitudinal recess C, the sides of the bottom portion of which are first substantially parallel, as shown at D, E, and then diverge outwardly, as shown at F, G. The outer width of this recess is less than the face width of the electrode, so that on each side of said recess are narrow face surfaces H, I.

In the bottom portion of recess C is seated a bar J, preferably of copper and secured in place by screw K, and on the face surfaces H, I are secured by screws L, similar bars M, N. The bars M, N project inwardly over the diverging sides F, G of recess C for a short distance, and the bar J extends inwardly into said recess for a distance beyond said diverging sides F, G.

When one of two parts O, P to be welded—as, for example, the semi-tubular section O—is placed in its electrode, said section is received in suitable concavities in the bars J, M, N and so is seated only on said bars and does not bear against the diverging sides F, G of the recess C. Only the concave faces of the bars need be nicely fitted to the object, and as said bars become worn or otherwise injured it is easy to remove them and substitute new ones.

We claim:

1. An electrode for electrical welding machines, comprising a body portion having a longitudinal recess receiving one of the objects to be welded, and projections therein supporting said object.

2. An electrode for electrical welding machines, comprising a body portion having a longitudinal recess receiving one of the objects to be welded, and parallel bars on said body portion and projecting into said recess; the said bars supporting the object to be welded.

3. An electrode, as in claim 1, and means for removably securing said projections to said body portion.

In testimony whereof we have affixed our signatures in presence of two witnesses.

THOMAS E. MURRAY, JR.
JOSEPH B. MURRAY.

Witnesses:
GERTRUDE T. PORTER,
MAY T. McGARRY.